United States Patent Office 3,515,870
Patented June 2, 1970

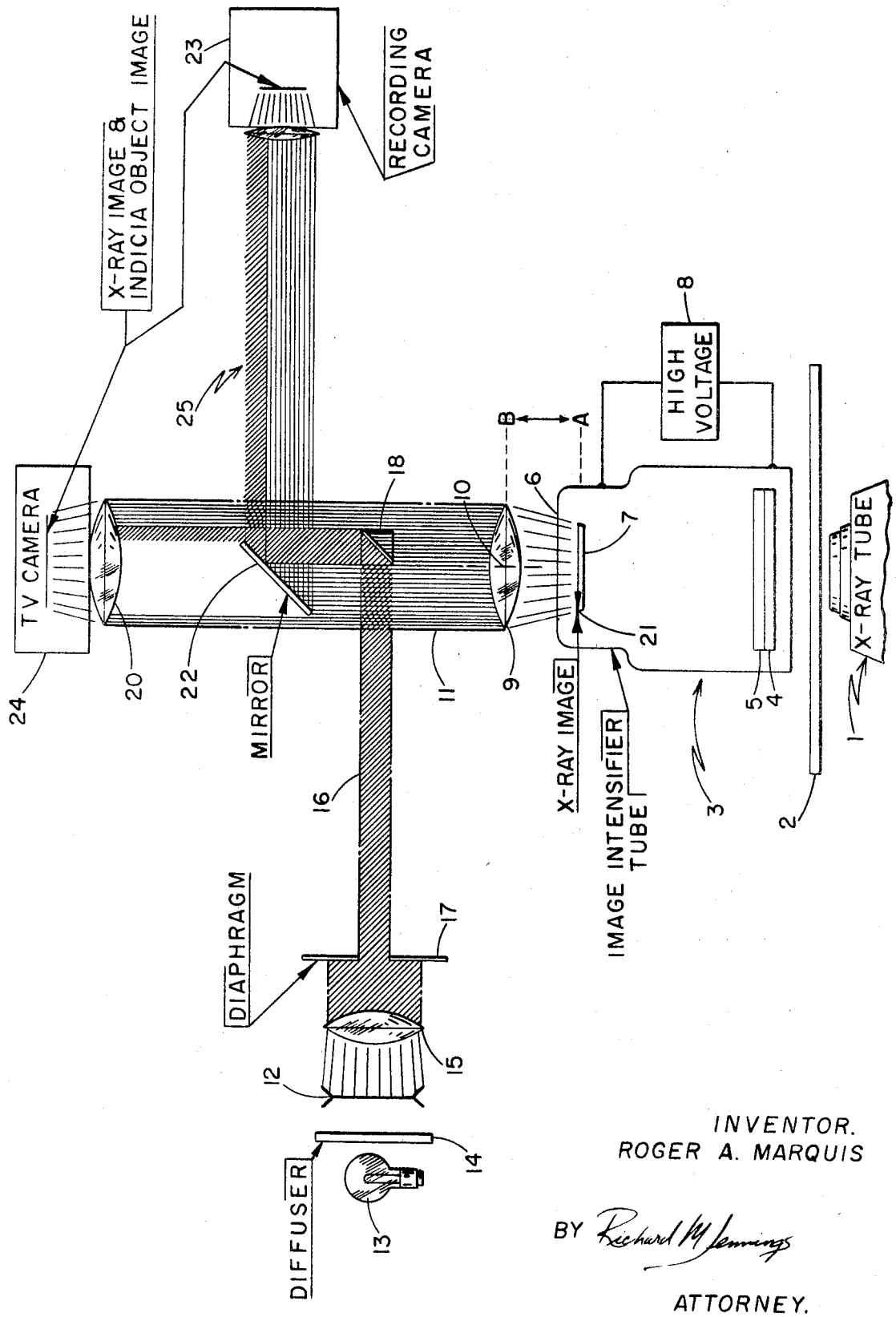

3,515,870
X-RAY SYSTEM FOR SUPERIMPOSING THE IMAGE OF A REFERENCE OBJECT AND AN X-RAY IMAGE
Roger A. Marquis, Natick, Mass., assignor, by mesne assignments, to Keleket CGR, Waltham, Mass., a corporation of Delaware
Filed Feb. 3, 1967, Ser. No. 613,961
Int. Cl. G03b 41/16
U.S. Cl. 250—65                                    10 Claims

ABSTRACT OF THE DISCLOSURE

This invention relates to the superimposition of an image of an object, which bears reference indicia, onto an X-ray image in an X-ray system. An objective lens having an infinite focus characteristic is positioned to receive light associated with a fluorescent X-ray image and transform the light into a first beam of substantially parallel light rays. An indicia object, such as a reticle display, is illuminated by means of a light source. A projecting lens, also having an infinite focus characteristic, acts to transform the light emerging from the indicia object into a second beam of substantially parallel light rays and to project this beam in a path toward the first beam. A reflecting means, which may be a right angle prism or mirror, is disposed within the first beam of parallel light rays a short distance from the objective lens. The reflecting means is orientated in such a manner that the second beam of light rays falls upon a highly reflective surface thereof. This redirects the second beam into a path which is along the same path as that of the first beam. A further lens is disposed downstream from the reflecting means to simultaneously form real images of both the indicia object and the fluorescent X-ray image in a common focal plane with the indicia object image being superimposed onto the X-ray image.

INVENTION BACKGROUND

This invention relates in general to the projection and formation of visual X-ray images by means of an infinite focus conjugate optical lens arrangement in an X-ray apparatus.

In the field of medical X-ray examination there is a great need for a flexible automatic recording means to permanently mark patient X-ray films with up-to-date information and reference data desired by the examining doctor. Presently, such a task is generally carried out by laboratory technicians who manually clip or otherwise secure to the various X-ray films separate elements bearing the desired information. Not only is this process cumbersome and time consuming but more important it is both inflexible and subject to human error. With regard to the latter, inasmuch as the marking is generally done with a large group of X-ray films at a time, it is easy to inadvertently attach the wrong identification tag to a particulary X-ray film.

This significant void in the procedure of X-ray film examination is aptly filled by the present invention. In this regard, the invention provides a system which permits the operator to select at will various grid patterns, names and dates or other information of interest, and superimpose this information onto the X-ray film contemporaneously with the actual X-ray exposure of the patient. Thus, the desired information is permanently recorded on the X-ray film simultaneous with its development and a major source of error is thereby eliminated. Furthermore, the type and quantity of information which may be used is dictated only by the need and the area available on the X-ray film. Of course, the reference indicia may be presented to a TV camera at the same time it is permanently recorded by means of a cine camera.

These and other advantages and features of this invention will become apparent from the following detailed description when taken in conjunction with the drawing in which:

The drawing is a diagrammatic illustration of the general arrangement of the significant components of the X-ray system in accordance with the principles of the present invention.

With reference now to the drawing it will be observed that reference numeral 1 designates an X-ray tube for emitting a beam of X-rays toward a fluoroscopic device including an image intensifier tube 3 disposed above a table 2 which is adapted to support the patient to be examined. Generally, the fluoroscopic device is mounted so that it may be moved or adjusted in both the vertical and horizontal directions to facilitate observation of the patient. Table 2 itself may be tiltable to enable the patient to be easily examined in either a standing or prostrate position.

Image intensifier tube 3 generally includes a fluorescent screen 4 comprising a photon emitting phosphor in intimate contact with a photoelectric element 5 adapted to emit electrons in response to photon energy emitted by the phosphor. At the opposite end 6 of image intensifier tube 3 there is provided a second fluorescent screen 7 which converts electrons striking its outer surface into photon energy. The electrons emitted by photo-electric element 5 are accelerated to a high velocity before striking fluorescent screen 7. Acceleration is accomplished by means of an electrostatic field which is produced by a high voltage source 8, on the order of 30,000 volts, applied to the image intensifier tube 3.

An objective lens 9 having an infinite focus characteristic and an optical axis 10 is disposed directly above the output end 6 of image intensifier tube 3 at a distance A–B equal to the first focal length of objective lens 9. That is, the separation between fluorescent screen 7 upon which the visual X-ray image is formed and objective lens 9 measured along optical axis 10 is such that the objective lens is focused at infinity. This means that lens 9 acts to transform the light emitted by fluorescent screen 7 into a first beam of substantially parallel light rays 11.

Perhaps it should be mentioned that, strictly speaking, a lens focused at infinity transforms light rays associated with each finite point on the image into a plurality of groups of parallel light rays. That is, light rays from a single point on the image are transformed into one group of parallel rays by the lens while those from another point are formed into a second group. One such group of parallel rays is not perfectly parallel to the other group. In other words, the light beam is in reality comprised of a plurality of groups of parallel light rays with the path direction of each group depending on the point of the image from which the light rays in the group originally emanated. Inasmuch as the non-parallelism of the groups is slight, the light beam may be considered, at least for purposes of this description, to be made up of a plurality of substantially parallel light rays.

Laterally displaced from first beam 11 there is provided an indicia object 12 having appropriate indicia thereon to be superimposed onto the final X-ray image. By way of example, and solely for purposes of illustration, it will be assumed that indicia object 12 is a slide transparency of a reticle display. Of course, indicia object 12 may take other forms, including a film, drawing, optical display, cathode ray tube, or any other suitable means for storing and displaying desired information.

Also the reference indicia, instead of a reticle display, may be patient information such as name, age, date, etc., or rectangular, circle, or polar coordinates, directional arrows to mark significant points of interest on the X-ray image being examined, or various combinations of the above.

Directly behind indicia object (slide transparency) 12 there is provided a light source 13 to illuminate the slide transparency 12 and a diffuser device 14 interposed between slide transparency 12 and light source 13 for defracting the light so as to provide illumination of substantial equal intensity over the entire surface area of slide transparency 12. A projecting lens 15, which like objective lens 9 has an infinite focus characteristic, is disposed immediately in front of indicia object 12 at a distance equal to the first focal length of the lens so as to transform light emerging from indicia object 12 into a second beam of substantially parallel light rays 16. A diaphragm 17 is positioned in front of projecting lens 15 to confine the second light beam 16 in a relative narrow path as it travels toward first beam 11. Although the beam projected by lens 15 is coned down, the location of the diaphragm 17 with respect to lens 15 is such that light beam 16 after passing through diaphragm 17 is still characterized by light rays associated with all points on the object 12.

A reflecting means 18, which may take the form of a right angle prism, mirror, Lucite rod or fibre optic device, is disposed within the path of first light beam 11 a short distance from objective lens 9. In this case the reflecting means is shown as a substantially right angle prism having a highly reflective inclined surface which is orientated to intercept the second light beam 16 and redirect the same along a path which is coextensive with that of the first light beam 11. It is significant to note that the size of the reflecting prism 18 is small relative to the cross-sectional area of beam 11 in which the prism reposes. That is to say, the surface area of reflecting prism 18 is such as to block the passage of only a small portion of the overall light beam 11. Although for purposes of illustration the prism has been depicted as unsupported, in practice the prism 18 is mounted on a narrow ridge, which extends diametrically across objective lens 9.

Downstream from the reflecting means 18 there is provided an additional optical lens 20 which may be a field lens, if the observer desires to view the final image directly, or as depicted in the embodiment shown in the drawing, a TV lens cooperating with a conventional TV camera 24 to project the image onto a TV screen for viewing. That is, the lens 20 acts to simultaneously produce real images of the intensified X-ray image 21 and the indicia object 12 in a common focal plane, which in this case is the input of the TV camera, wherein the indicia object image is superimposed onto the X-ray image.

A relative small area mirror 22 is interposed between the reflecting means 18 and TV lens 20 and is adapted to reflect the image toward the cine camera 23, which is laterally displaced from the path of the combined light beams in a path 25. Although the reflecting means has been illustrated as a mirror, it should be understood that a suitable beam splitting element may be used in place of the mirror.

Like prism 18, the surface area of mirror 22 is small relative to the cross sectional area of light beam 11 so as not to interfere with the X-ray image being transferred. Moreover, the mirror 22 is positioned in the beam so that at least a portion of the light beam 16 by-passes the mirror 22 and falls upon TV lens 20. In this manner, the desired combined image is split between the cine camera 23 and TV camera 24 whereby the image may be simultaneously visually presented and permanently recorded on film.

In practice mirror 22 takes the form of an ellipse with the length of the major axis being substantially equal to the diameter of the lens cooperating with camera 23. As a consequence a substantial portion, relatively speaking, of each light beam 11 and 16, respectively, is reflected to cine camera 23. Since, as well known, a movie camera for optimum performance requires a more intense light than a TV camera, such an arrangement enables the system to operate at maximum efficiency.

Mirror 22 may be pivotally mounted about an axis thereof and driven by a motorized means (not shown) to rotate the mirror 180° from its illustrated position. In this latter position the mirror reflects the image in a direction diametrically opposite to the path 25 which enables the system to utilize, if desired, a second movie or still camera (not shown) disposed opposite to the cine camera 23.

In operation, X-rays emitted by X-ray tube 1 pass through table 2 upon which the patient reposes and impinge upon the surface of the phosphor element 4. Phosphor element 4 emits light in response to the impinging X-rays which light in turn is converted to electrons and amplified by means of photocathode 5. The electrons emitted by photocathode 5 are accelerated as previously described, and strike fluorescent screen 7. In this manner, highly intensified visual image 21 of the initial X-ray image is produced by the image intensifier tube 3.

The light associated with the intensified X-ray image 21 is transformed by means of objective lens 9 into a first beam of substantially parallel light rays 11 and transmitted in this form past right angle prism 18 and pivotable mirror 22 to TV lens 20. Simultaneously therewith, the reference indicia in the form of a reticle display is projected from slide 12 in the form of a second beam of substantially parallel light rays 16 onto the highly reflective inclined surface of right angle prism 18. The inclined surface of right angle prism 18 is orientated at an approximately 45° angle with respect to the second light beam so as to direct the second beam into a path along that of the first light beam. It will be recalled that the optical lenses in the present system, with the exception of the TV lens and camera lens, are focused at infinity. This infinite focus conjugate lens arrangement permits the removal or introduction of information from any point in the light cone without any degradation of the image. That is, since objective lens 9 is focused at infinity the right angle prism 18, despite being situated within the path of the first light beam, does not cast a shadow on the final real image formed by the cameras. The only effect of the prism on the parallel light beam is a small reduction in the overall brightness of the final image. The prism does, however, act to reflect the second beam of light rays containing the reticle information toward the TV camera in the manner previously discussed. TV lens 20 is then able to see both the first and second light beams containing the X-ray image and reticle information, respectively, and simultaneously form real images of the same in a common focal plane with the reticle image being superimposed on the X-ray image. Of course, as previously discussed, mirror 22 acts to reflect a portion of each light beam toward cine camera 23 so that the composite X-ray and reticle images are recorded on film for subsequent use in addition to being presented on a television screen.

While certain features of the invention have been discussed in detail, it will of course be apparent that modifications may be made that are within the scope of the present invention. For instance, a portion of light beam 11 may be reflected out of its illustrated path by means of the right angle prism so that the beam may be utilized for ancillary control purposes. Consequently, the invention herein described is to be construed to be limited only by the spirit and scope of the appended claims.

What is claimed is:

1. In an X-ray system including means to provide a luminous image of an initial X-ray image, the improvement comprising: a lens having an infinite focus characteristic cooperating with an image amplifying means to transform light associated with the luminous image into a first beam of substantially parallel light rays, an indicia object, means to provide a second beam of substantially parallel light rays associated with said indicia object, reflecting means disposed in the path of the first beam of parallel rays to direct the second beam along the same path as that of said first beam, and means to simultaneously transform both said first and second beams of substantially parallel light rays into a composite real image wherein the indicia object image is superimposed onto the 5-ray image.

2. In an X-ray system including an image intensifier tube to produce an intensified luminous replica of an initial X-ray image, the improvement comprising: a first lens having an infinite focus characteristic to transform light associated with the intensified luminous X-ray image into a first beam of substantially parallel light rays, an indicia object displaced from the path of said first beam of substantially parallel light rays, means to illuminate said indicia object, a second lens having an infinite focus characteristic to provide a second beam of substantially parallel light rays from light emerging from said indicia object, means disposed in the path of the first beam of light rays to project the second beam of light rays along the same path as that of said first beam and third lens means to simultaneously provide real images of the X-ray image and the indicia object in a common focal plane wherein the indicia object image is superimposed onto the X-ray image.

3. An X-ray system as claimed in claim 2 including in addition reflecting means interposed between said first lens and said third lens means, said reflecting means being disposed at an angle relative to the optical axis of said first lens wherein a portion of the light rays impinging thereon are reflected laterally of said axis.

4. An X-ray apparatus as claimed in claim 3 wherein said reflecting means is pivotally mounted on an axis thereof so that the direction of reflection of the impinging light rays may be varied.

5. An X-ray system as claimed in claim 2 wherein the means to project the second beam of light rays along the same path as that of said first beam comprises a right angle prism being orientated so that the inclined surface substantially intercepts the second beam of parallel light rays.

6. An X-ray system as claimed in claim 2 wherein the first lens is displaced from the image intensifier tube a distance equal to the first focal length of said lens.

7. An X-ray system comprising a source of X-rays, a fluorescent screen upon which said X-rays are directed to produce an X-ray image, first lens means having an infinite focus characteristic positioned to receive light from the optical image and transform the light into a first beam of substantially parallel light rays, an indicia object laterally displaced from the optical axis of said first lens means, second lens means having an infinite focus characteristic positioned to project a second beam of light rays from said indicia object toward said first beam, means disposed in the path of said first beam to redirect the path of said second beam in a path along most of the path of said first beam, and means to simultaneously form real images of said X-ray image and said indicia object in a common focal point with the indicia object image being superimposed on the X-ray image.

8. In an X-ray system including means to provide an X-ray image, apparatus comprising: first means to transform electromagnetic radiations associated with the X-ray image into a first beam of substantially parallel rays, an indicia bearing object, second means to transform electromagnetic radiations associated with said object into a second beam of substantially parallel rays, third means to direct the second beam in a path along the same path of that of the first beam, and means to form images of both the X-ray image and the object in a common focal plane wherein the object image is superimposed on the X-ray image.

9. An X-ray apparatus as claimed in claim 8 comprising in addition: reflecting means located between said first and third means and disposed in at least a portion of the paths of both said first and second beams, said reflecting means being orientated at an angle with respect to the paths of said first and second beams to reflect a portion of each of said beams out of said paths.

10. In an X-ray apparatus: means to provide an X-ray image, means to focus the X-ray image at infinity, an indicia bearing object, means to focus the image of said object at infinity, and means to form real images of both the X-ray image and the object wherein the object image is superimposed on the X-ray image.

References Cited

UNITED STATES PATENTS

| 2,344,823 | 3/1944 | Landis et al. | 250—65 |
| 2,765,704 | 10/1956 | Mottu | 356—166 |
| 3,126,480 | 3/1964 | Bouwers | 250—65 |
| 2,433,129 | 12/1947 | Land | 250—65 |

ARCHIE R. BORCHELT, Primary Examiner

A. L. BIRCH, Assistant Examiner

U.S. Cl. X.R.

250—67, 77; 356—166